United States Patent [19]

Lenk et al.

[11] Patent Number: 4,721,693
[45] Date of Patent: Jan. 26, 1988

[54] SILICATE RAW MATERIAL FOR CERAMICS, PROCESS FOR PREPARING SAME AND USE THEREOF

[75] Inventors: Siegfried Lenk, Selb; Karl-Heinz Ulbrich; Willi Backhaus, both of Goslar, all of Fed. Rep. of Germany

[73] Assignee: Zinkweiss-Forschungsgesellschaft mit beschrankter Haftung, Goslar, Fed. Rep. of Germany

[21] Appl. No.: 865,366

[22] Filed: May 21, 1986

[30] Foreign Application Priority Data

May 22, 1985 [DE] Fed. Rep. of Germany ....... 3518372

[51] Int. Cl.$^4$ .................................................. C03C 8/02
[52] U.S. Cl. ....................................... 501/21; 501/72; 501/133; 501/154
[58] Field of Search .................... 501/14, 21, 72, 133, 501/154

[56] References Cited

PUBLICATIONS

Phase Diagrams for Ceramists, 1975–Levin et al., pp. 206–207.
Phase Diagrams for Ceramists, 1964–Levin et al., p. 155.

*Primary Examiner*—Ferris H. Lander
*Attorney, Agent, or Firm*—Wegner & Bretschneider

[57] ABSTRACT

A silicate raw material for ceramics containing alkali oxides, zinc oxide and silicon dioxide is characterized in that the three components alkali oxide, zinc oxide and silicon dioxide are present as calcined three-component silicates in a molar ratio of from 1:1:2 to 1:2:6, preferably in integral molar ratios, are employed.

4 Claims, No Drawings

SILICATE RAW MATERIAL FOR CERAMICS, PROCESS FOR PREPARING SAME AND USE THEREOF

The present invention relates to silicate raw materials for ceramics containing alkali oxide, zinc oxide and silicon dioxide, a process for preparing same and the use thereof.

BACKGROUND OF THE INVENTION

Glazes, whether raw glazes or spar glazes or frit containing glazes, in general are mixtures of inorganic compounds present in defined mixing ratios, which mixtures are applied onto ceramic compositions in the form of a glaze slip and during glaze baking are melted to form an enamel. Glazes for use at baking temperatures of less than 1200° C. mostly consist of ceramic frits and additives. The production of said frits depends on the use of water-soluble raw materials such as alkali compounds, boron compounds or lead compounds, which, in the course of the melting process employed in the production, are converted to resistant glasses.

For glazes and frits which form ceramic glasses, more specifically, there are used oxides sin combination with silicon dioxide. These oxides are $B_2O_3$, $Al_2O_3$, $K_2O$, $Na_2O$, $Li_2O$, CaO, MgO, $SrO_2$, BaO, ZnO, PbO, $SnO_2$ and $ZrO_2$. The individual oxides are intended to serve different purposes in the glaze. PbO, $B_2O_3$ and the alkalineoxides are considered to be typical fluxes. $SnO_2$ and $ZrO_2$ are added to impart a white opaqueness to the glaze.

The frits employed in the glazes are prepared by melting the individual components in a melt process to form multicomponent silicates. These melts are solidified by quenching them in water or between cooled rollers. More particularly, cooling between cooling rollers is employed in continuous melting processes or with frits having an insufficient amount of silicate bonding, especially when the compounds of sodium, potassium or boron are present in higher proportions. The melting process for producing frits is carried out either periodically in rotary melting furnaces or in tank furnaces by use of a continuous melting procedure. In all of these production processes the melter units are are lined with refractory ceramic materials. The mixtures, in order to be provided with a sufficient flowability, must be heated above their melting point. Depending on the viscosity of these glasses there is an attack against the lining of the melting unit which becomes noticeable as wear and requires the ceramic lining materials to be frequently replaced. For quenching the liquid melt a large amount of water is necessary.

If, in raw glazes or spar glazes or even in frits, zinc oxide or zinc carbonate is used, high losses due to sublimation occur, especially where baking is conducted under reducing conditions. Apart from the undesirable loss of zinc, the sublimation causes disturbing deposits in the furnace which deposits have to be removed periodically with considerable expenditure of work. Therefore, attempts have been made in the art to keep the zinc oxide content in glazes as low as possible or even to completely avoid the use of zinc oxide, thereby to reduce or avoid the undesirable consequences of the sublimation.

SUMMARY OF THE INVENTION

It is the object of the present invention to avoid as much as as possible the zinc oxide losses by sublimation. It is another object of the present invention to develop reliable silicate raw materials for ceramics which may reliably be produced at reasonable costs, are well processable and result in the formation of glazes which have at last the quality of the glazes presently in use.

Said objects, surprisingly, can be attained by use of mixtures containing alkali oxides, zinc oxide and silicon dioxide, which are employed as calcined three-component silicates having molar ratios ranging from 1:1:2 to 1:2:6. It is preferred that the three components alkali oxide, zinc oxide and silicon dioxide are employed in an integral molar ratio. For use as a raw material for ceramic glazes, other silicate glasses and ceramic compositions they are crushed to form coarse particles or subsequently comminuted to form a powder.

The preparation of the silicate raw materials for ceramics according to present invention is effected by mixing the constituents alkali oxide, zinc oxide and silicon dioxide in molar ratios of from 1:1:2 to 1:2:6, calcining the mixture at a temperature of from 900° C. to 1000° C. to form three-component silicates, cooling and comminuting same and, optionally mixing the resulting product with other three-component silicates comprising alkali oxide, zinc oxide and silicon dioxide.

It is preferred that the three comonents of the calcined three-component silicate are present in a molar ratio of integers. Preferably, the components are mixed, granulated, compressed to form blanks an calcined in conveyor furnaces. After cooling they may be crused in conventional manner and, if desired, they may be mixed with other silicate raw materials according to the invention or other constituents for ceramic glazes or ceramic compositions and subjected to further processing.

The silicate raw materials for ceramics and the process for producing same have a number of advantages where were not foreseeable.

While the production of frits is carried out, depending on their compositions, at a temperture between 1000° C. and 1400° C., in which procedure the frit batch must be completely melted and then rapidly cooled to a low temperature, the three-component silicates according to the invention are obtained already upon calcination at a temperature of from 900° C. to 1000° C. Calcination temperatures of from 920° C. to 960° C. are preferred. The temperatures are selected so that the components, when being calcined, will sinter to form a foamy glass mass without melting completely. The calcined three-component silicates thus formed can be crushed and ground without any particular difficulties. The resulting powders may directly be stirred with water to form a glaze slip. However, if desired, several different types of these three-component silicates can be mixed with each other, since in the glaze baking step they are miscible with each other to an unlimited extent. If desired, conventional glaze constituents may be admixed to the mixtures. These include colorant pigments, other materials such as kaolin, clay, lime spar, feldspar etc. or also certain amounts of the previously employed frits.

The silicate raw materials of the invention will soften at from 820° C. to 900° C., depending on the molar proportion of $SiO_2$. The viscosity drop (beginning flow) is between 950° C. and 1040° C. The novel glazed produced with these three-component silicates, thus, can be used in the entire range of the ceramic glazes having enamel baking temperatures in excess of 1050° C.

In contrast to the known glazes based on zinc oxide or zinc carbonate as so far known the glazes based on the silicate raw materials of the invention virtually do not suffer from any losses due to sublimation. The zinc losses are surprisingly low even upon baking under reducing conditions.

As the production of the three-component silicates is effected without complete melting at a temperature of less than 1000° C., there is substantially no contact between the three-component compositions and the lining of the furnace, so that there are neither contaminations due to wear of the furnace lining materials nor losses of the calcined product. As the calcination temperatures required for the silicate formation are lower by 100° C. to 200° C. than the melting temperatures so far necessary in the preparation of ceramic frits, significant amounts of energy are saved as well.

If the mixture comprising the three initial components alkali oxide, zinc oxide and silicon dioxide is formed into granules and comprises into blanks, these are capable of being stacked in conveyor furnaces.

Another surprising advantage of the silicate raw materials according to the invention consists in that, with use of certain molar proportions, the silicon dioxide in part recrystallizes the zinc oxide in the glass phahse and thereby yields a white-opacified glossy glaze. Thus, in use of the invention, no additives such as tin dioxide or zirconium dioxide are required. Furthermore, fluxes such as lead and boron compounds are entirely dispensable. Even for those silicate raw materials having a high zinc oxide content, loss due to sublimation of zinc is extraordinarily low.

Also astonishing is the coefficient of expansion of the silicate raw materials according to the invention, with representative low values of 2.2 to $2.7 \times 10^{-7}$.

It is also surprising that a glaze prepared from the silicate raw material according to the invention is not readily fluid, but shows a moderate course and a wider interval of softening. It is readily possible to produce a matte glaze, a transparent highly glossy glaze or a white-opaque glaze, the letter without addition of conventional white-opacifiers. The beneficial properties of the novel silicate raw materials enable significant savings in time. They may be applied onto the body by a quick-baking procedure, irrespectively of whether the baking is carried out under an oxidizing, reducing or neutral atmosphere. Glazes are made from said three-component silicates do not contain any lead compounds, and, therefore, conform to the strict regulations on the emission of materials hazardous to health, such as lead, according to the German Industry Standards of DIN 51 031 and DIN 51 032.

Surprisingly, it has further been found that the silicate raw materials according to the invention are also suitable for addition to ceramic compositions. To this purpose, they may be used in the place of feldspare, calcium or magnesium silicates, and they cause the sintering temperatures to be significantly lowered. For a hard porcelain composition which normally is baked at from 1380° C. to 1400° C.,the baking temperature can be lowered to from 1200° C. to 1250° C. by adding the silicate raw material according to the invention in the place of feldspar. When two thirds of the feldspar are replaced with the three-component silicates according to the invention, the product will sinter to become impervious already at 1250° C. Another advantage of the use of the silicate raw materials according to the invention in ceramic compositions is that these silicates are much easier to be kept constant in the composition and, thus, variations occuring with the use of natural minerals can be avoided.

On addition of the silicate raw materials to ceramic compositions, the properties of the body are beneficially affected by reducing the baking temperature, improving the expansion coefficients, reducing the required baking periods, increasing mechanical strength with a lower baking temperature and improving adhesion of the glazes.

It is preferred that the three-components of the silicate raw material according to the invention are employed in molar ratios as constituted by integers. This results in a particularly low sensitivity to water and particularly low melting temperatures. With an excess of alkali the water-solubility is increased, and with an excess of the components zinc oxide and, more particularly, silicon dioxide, the softening temperature is increased. Thus, in practice, the deviations from the integral molar ratios should be kept as small as possible.

The present invention is described in greater detail by way of some typical and preferred compositions of the silicate raw material of the invention as set forth in the following non-limiting examples.

EXAMPLE 1

A silicate raw material for ceramics consisting of the three components alkali oxide, zinc oxide and silicon dioxide, contains 1 mole of $K_2O$, 2 moles of ZnO and 4 moles of $SiO_2$. The three components are homogeneously mixed with each other and compressed to form briquets. The briquets are sintered in a conveyor furnace at about 950° C., allowed to cool and then ground. The ground product is processed with water and, optionally, other conventional ingredients to form a glaze slip which is baked at 1050° C. The glaze is equivalent to known high-quality glazes.

EXAMPLE 2

In a manner analogous to that of EXAMPLE 1, 1 mole of $Na_2O$, 2 moles of ZnO and 6 moles of $SiO_2$ are processed. The resulting product also gave an excellent glaze and is suitable as a component of ceramic compositions.

EXAMPLE 3

36% by weight of the ceramic raw material produced according to EXAMPLE 2 are mixed with 18% by weight of lime spar, 12% by weight of dolomite, 8% by weight of kaolin and 26% by weight of quartz to make a glaze batch. At a baking temperature of from 1200° C. to 1250° C. white-colored glazes are formed.

EXAMPLE 4

50% by weight of the three-component silicate according to EXAMPLE 1 comprising a molar ratio of 1:2:4 are processed with 15% by weight of lime spar, 7% by weight of dolomite, 5% by weight of kaolin and 23% by weight of quartz to form a glaze slip. At a baking temperature between 1160° C. and 1200° C. a transparent glaze is formed.

What is claimed is:

1. Silicate raw materials for manufacture of ceramics consisting essentially of alkali oxides selected from the group consisting of sodium oxide and potassium oxide, zinc oxide and silicon dioxide, wherein the three components alkali oxide, zinc oxide and silicon dioxide are calcined at a temperature of 900°–1000° C. and comminuted into powders of three-component silicates in an integral molar ratio of from 1:1:2 to 1:2:6.

2. Process for preparing a silicate raw material for manufacture of ceramics, consisting essentially of alkali oxides selected from the group consisting of sodium oxide and potassium oxide, zinc oxide and silicon dioxide, characterized in that the components alkali oxide, zinc oxide and silicon dioxide are mixed with each other in an integral molar ratio of from 1:1:2 to 1:2:6, calcined to form three-component silicates at a temperature of from 900° C. to 1000° C., allowed to cool and comminuted.

3. Process of claim 2, wherein the comminuted product is mixed with other three-component silicates prepared from alkali oxide, zinc oxide and silicon.

4. The processing according to claim 2, wherein after mixing the components, the mixture is converted into granules, compressed to form blanks and calcined in conveyor furnaces.

* * * * *

UNITED STATES PATENT AND TRADEMARK OFFICE
CERTIFICATE OF CORRECTION

PATENT NO. : 4,721,693
DATED : January 26, 1988
INVENTOR(S) : Siegfried LENK et al.

It is certified that error appears in the above-identified patent and that said Letters Patent is hereby corrected as shown below:

Column 1, line 26, change "sin" to --in--.

Column 1, line 47, delete "are" (second occurrence).

Column 1, line 62, change "ofwork" to --of work--.

Column 2, line 33, change "crused" to --crushed--.

Signed and Sealed this

Eighteenth Day of April, 1989

Attest:

DONALD J. QUIGG

Attesting Officer

Commissioner of Patents and Trademarks